US012477615B2

(12) United States Patent
Fan

(10) Patent No.: US 12,477,615 B2
(45) Date of Patent: Nov. 18, 2025

(54) MULTI-CARD MOBILE TERMINAL TO SHARE COMMON WIRELESS PROCESSING RESOURCES OF THE MOBILE TERMINAL

(71) Applicant: SPREADTRUM COMMUNICATIONS (SHANGHAI) CO., LTD., Shanghai (CN)

(72) Inventor: Wei Fan, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 471 days.

(21) Appl. No.: 17/922,453

(22) PCT Filed: Apr. 21, 2021

(86) PCT No.: PCT/CN2021/088640
§ 371 (c)(1),
(2) Date: Oct. 31, 2022

(87) PCT Pub. No.: WO2021/218734
PCT Pub. Date: Nov. 4, 2021

(65) Prior Publication Data
US 2023/0171811 A1    Jun. 1, 2023

(30) Foreign Application Priority Data

Apr. 30, 2020   (CN) ........................ 202010365180.9

(51) Int. Cl.
*H04W 74/08* (2024.01)
*H04W 48/02* (2009.01)
(Continued)

(52) U.S. Cl.
CPC ........... *H04W 76/27* (2018.02); *H04W 48/02* (2013.01); *H04W 48/08* (2013.01); *H04W 74/0833* (2013.01); *H04W 74/0836* (2024.01)

(58) Field of Classification Search
CPC . H04W 74/0833; H04W 76/27; H04W 48/02; H04W 48/08
See application file for complete search history.

(56) References Cited

U.S. PATENT DOCUMENTS

| 2015/0289141 | A1  | 10/2015 | Ghasemzadeh et al. |
| 2015/0341333 | A1* | 11/2015 | Feng ..................... H04L 9/3297 |
| | | | 713/168 |

(Continued)

FOREIGN PATENT DOCUMENTS

| CN | 106332315   | * | 1/2017 |
| CN | 106332315 A |   | 1/2017 |

(Continued)

OTHER PUBLICATIONS

Temporary UE capability restriction stage-2 framework Gothenburg, Sweden, Aug. 20-24, 2018 (Year: 2018).*

(Continued)

*Primary Examiner* — Mewale A Ambaye
(74) *Attorney, Agent, or Firm* — HAUPTMAN HAM, LLP

(57) ABSTRACT

A multi-card mobile terminal, a network configuration method of a multi-card mobile terminal, and a non-transitory computer-readable medium are provided. The network configuration method includes the following. In response to a first network access state of a SIM card of a multi-card mobile terminal being a connected state and another SIM card of the multi-card mobile terminal requesting to access a target network, access request information of the another SIM card is generated and transmitted to a target network-side device, where the access request information includes a capacity limitation indication, and the capacity limitation indication is configured to indicate that a current terminal wireless capacity of the multi-card mobile terminal is limited. Network configuration information corresponding to (Continued)

the access request information transmitted by the target network-side device is received. The multi-card mobile terminal is configured according to the network configuration information.

18 Claims, 6 Drawing Sheets

(51) Int. Cl.
*H04W 48/08* (2009.01)
*H04W 74/0833* (2024.01)
*H04W 76/27* (2018.01)
*H04W 74/0836* (2024.01)

(56) References Cited

U.S. PATENT DOCUMENTS

| | | | | |
|---|---|---|---|---|
| 2016/0241722 A1* | 8/2016 | Hao | ....................... | H04W 12/04 |
| 2020/0322918 A1* | 10/2020 | Shih | ....................... | H04W 76/11 |
| 2023/0345524 A1* | 10/2023 | Bae | ..................... | H04W 74/004 |
| 2023/0354009 A1* | 11/2023 | Hong | ..................... | H04W 8/183 |
| 2024/0114516 A1* | 4/2024 | Ma | ........................ | H04L 1/1812 |
| 2024/0251446 A1* | 7/2024 | Prasad | ................ | H04W 74/004 |

FOREIGN PATENT DOCUMENTS

| | | |
|---|---|---|
| CN | 106464611 A | 2/2017 |
| CN | 109309915 A | 2/2019 |
| CN | 109587789 A | 4/2019 |

OTHER PUBLICATIONS

Intel Corporation, "Temporary UE capability restriction Stage-2 framework", 3GPP TSG-RAN WG2 Meeting #103, R2-1811683, Aug. 10, 2018.
WIPO, International Search Report and Written Opinion for International Application No. PCT/CN2021/088640, Jul. 15, 2021.
The first office action issued in corresponding CN application No. 202010365180.9 dated Oct. 8, 2021.
The second office action issued in corresponding CN application No. 202010365180.9 dated Mar. 3, 2022.

* cited by examiner

MULTI-CARD MOBILE TERMINAL TO SHARE COMMON WIRELESS PROCESSING RESOURCES OF THE MOBILE TERMINAL

CROSS-REFERENCE TO RELATED APPLICATION(S)

This application is a National Stage of International Application No. PCT/CN2021/088640, field Apr. 21, 2021, which claims priority to Chinese Patent Application No. 2020103651809, filed Apr. 30, 2020, the entire disclosure of which are hereby incorporated by reference.

TECHNICAL FIELD

The disclosure relates to the field of network communication technology, and more particularly to a multi-card mobile terminal, a network configuration method of a multi-card mobile terminal, and a non-transitory computer-readable storage medium.

BACKGROUND

In a $5^{th}$-generation mobile communication technology (5G) evolution standard release 17 (Rel-17), standardization of multi-card mobile terminals is required to be discussed, and therefore some coordination tasks between multiple cards originally implemented independently by the mobile terminal can be coordinated by a network side.

Multiple cards of a multi-card mobile terminal share common wireless processing resources of the mobile terminal. On condition that a subscriber identity module (SIM) card of the multi-card mobile terminal is in a connected state, and in this case large part of the wireless processing resources of the mobile terminal has been used for services of the SIM card, a certain limitation therefore exists on configuration information transmitted by a network in response to random access (RA) if another SIM card (i.e., a non-connected-state card) of the multi-card mobile terminal needs to initiate the RA.

However, the limitation exists at the mobile terminal, and a network side of the non-connected-state card does not know the latest condition, and therefore some coordination between the multiple cards implemented independently by the mobile terminal cannot effectively solve this condition, thereby possibly causing failure of the RA.

The essence of the problem is how to divide limited communication processing link resources of the mobile terminal on condition that a card of the mobile terminal is in the connected state and another card of the mobile terminal is going to enter the connected state or also in the connected state.

Currently, as for existing solutions, communication processing link resources of the mobile terminal can be statically divided, and the communication processing link resources of the mobile terminal can also be dramatically divided.

Main shortcomings of the static division are that a mobile terminal capacity cannot be completely used to satisfy user needs, and conflict on carrier frequency configuration cannot be avoided if two cards both belong to a same operator.

Therefore, for solving the shortcomings of the static division, a solution of dramatic division is further proposed currently.

However, in the current solution of dramatic division, if a first SIM card of the mobile terminal is in the connected state, and a second SIM card of the mobile terminal requests to enter the connected state (the first SIM card is already in the connected state), since the mobile terminal capacity may be exceeded, the mobile terminal is required to actively indicate, through an accessed signal or signaling, that the network needs to limit configuration in a radio resource control (RRC)-related message or in an RA procedure not to exceed the mobile terminal capacity.

However, in the above solution, a process similar to overheating processing can be applied only if an SIM card has entered the connected state, and no solution is disclosed currently in a procedure that an SIM card is entering the connected state.

Furthermore, the above problem will get worse if the second SIM card originally in an inactive state enters the connected state again through an RRC resume procedure, because blind allocation of resources can be performed in this case, e.g., carrier aggregation (CA) and/or dual-connectivity (DC) configuration can be blindly allocated, and then the CA and/or DC configuration may exceed a terminal wireless capacity limitation in this case in the RRC resume procedure. Moreover, before the mobile terminal reports a specific terminal wireless capacity limitation of the mobile terminal, if the network re-adjusts wireless configuration of the mobile terminal through an RRC reconfiguration procedure, the wireless configuration may also exceed the terminal wireless capacity limitation in this case.

Therefore, if configuration exceeds a mobile terminal capacity, the mobile terminal can only give up this access request according to a protocol.

SUMMARY

A network configuration method of a multi-card mobile terminal is provided. The network configuration method is applied to the multi-card mobile terminal and includes the following. In response to a first network access state of a subscriber identity module (SIM) card of the multi-card mobile terminal being a connected state and another SIM card of the multi-card mobile terminal requesting to access a target network, access request information of the another SIM card is generated and transmitted to a target network-side device, where the access request information includes a capacity limitation indication, and the capacity limitation indication is configured to indicate that a current terminal wireless capacity of the multi-card mobile terminal is limited. Network configuration information corresponding to the access request information transmitted by the target network-side device is received. The multi-card mobile terminal is configured according to the network configuration information.

A multi-card mobile terminal is provided. The multi-card mobile terminal includes a memory, a processor, and computer programs stored in the memory and capable of running on the processor. The processor is configured to execute the computer programs to implement the above network configuration method of a multi-card mobile terminal.

A non-transitory computer-readable storage medium is provided. The non-transitory computer-readable medium is configured to store computer programs, where the computer programs, when executed by a processor, are operable with the processor to implement the above network configuration method of a multi-card mobile terminal.

BRIEF DESCRIPTION OF THE DRAWINGS

The features and advantages of the disclosure can be better understood after reading the detailed illustration of implementations of the disclosure with reference to the accompanying drawings. In the accompanying drawings, components are not necessarily drawn to scale, and components with similar related characteristics or features may have the same or similar reference numerals.

DETAILED DESCRIPTION

The following will further illustrate the disclosure through implementations, but does not therefore limit the disclosure to the scope of the implementations.

For overcoming current existing deficiencies, a network configuration method of a multi-card mobile terminal is provided in an implementation. The network configuration method includes the following. In response to a current network access state of a subscriber identity module (SIM) card of the multi-card mobile terminal being a connected state and another SIM card of the multi-card mobile terminal requesting to access a target network, access request information of the another SIM card is generated and transmitted to an accessed target network-side device, where the access request information includes a predefined capacity limitation indication, and the capacity limitation indication is used to indicate to a network-side device that a current terminal wireless capacity of the multi-card mobile terminal is limited. The access request information of the another SIM card is received, and network configuration information corresponding to the access request information is generated and transmitted to the multi-card mobile terminal, where the network configuration information is used to indicate the multi-card mobile terminal to configure a network. The network configuration information is received, and the multi-card mobile terminal is configured according to the network configuration information.

In the implementation, the multi-card mobile terminal receives network configuration that is unable to be matched is effectively avoided, thereby effectively avoiding failure of a network access request of the multi-card mobile terminal, and thus improving network configuration efficiency.

Figure 3:
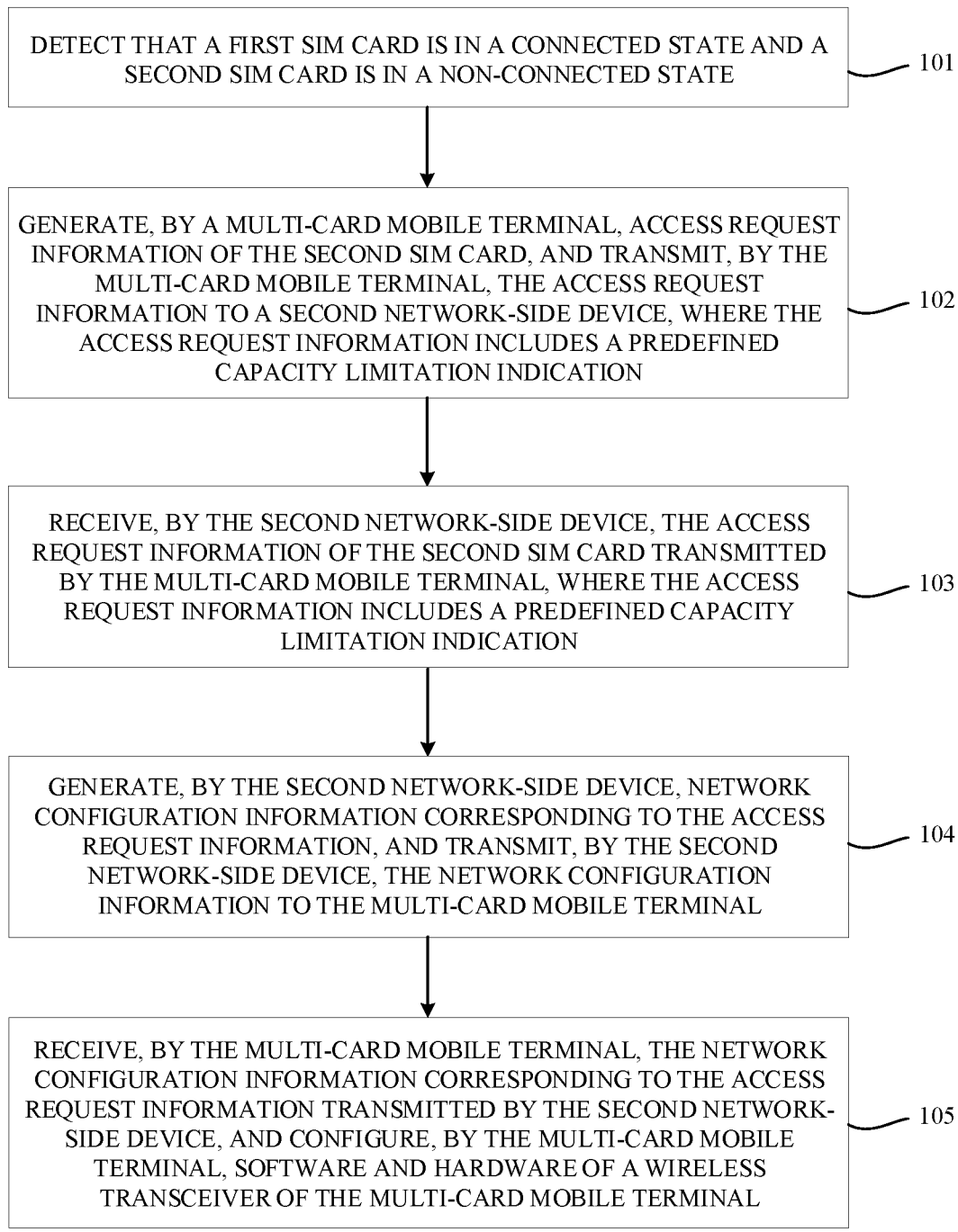
FIG. 3 is a schematic flow chart illustrating a network configuration method of a multi-card mobile terminal according to another implementation of the disclosure.

Specifically, as an implementation, as illustrated in FIG. 3, a network configuration method of a multi-card mobile terminal is provided in the implementation. The network configuration method mainly includes the following.

At 101, it is detected that a first SIM card is in a connected state and a second SIM card is in a non-connected state.

In the implementation, preferably, a communication network standard of the multi-card mobile terminal is a $5^{th}$-generation mobile communication technology (5G) standard, but a communication network type of the multi-card mobile terminal is not specifically limited and may also be a $2^{nd}$-generation mobile communication technology (2G) standard, a $3^{rd}$-generation mobile communication technology (3G) standard, a $4^{th}$-generation mobile communication technology (4G) standard, or other communication standards, which can be correspondingly selected and adjusted according to actual requirements.

In the implementation, preferably, the multi-card mobile terminal is a dual-card mobile terminal. The dual-card mobile terminal mainly includes a first SIM card and a second SIM card, where the first SIM card corresponds to a first network, and the second SIM card corresponds to a second network. However, the multi-card mobile terminal may also be a mobile terminal supporting more SIM cards, which can be correspondingly selected and adjusted according to actual requirements.

In the implementation, the first network and the second network may be a same operator network and may also be different operator networks, which both can be correspondingly selected and adjusted according to actual requirements.

In the implementation, a network-side device refers to a device at an accessed network side that corresponds to an SIM card of the multi-card mobile terminal. The network-side device may be a base station, a cloud server, etc., where a type of the network-side device is not specifically limited.

In the operations at 101, a current network access state of the first SIM card and a current network access state of the second SIM card are detected. If it is detected that the current network access state of the first SIM card is the connected state (e.g., radio resource control (RRC)_Connected) and the second SIM card in an idle state (e.g., RRC_IDLE Mode) or an inactive state (e.g., RRC_Inactive) initiates random access (RA), operations at 102 are to be performed.

Specifically, the multi-card mobile terminal in the idle state can also use the second SIM card to establish connection with the second network at first, and then enter the inactive state. Afterwards, the multi-card mobile terminal uses the first SIM card to establish connection with the first network and enters the connected state.

There are also other procedures. For example, the multi-card mobile terminal uses the first SIM card to establish connection with the first network and then enters the inactive state. Then the multi-card mobile terminal uses the second SIM card to establish connection with the second network and enters the inactive state. Afterwards, the first SIM card enters the connected state again.

In the implementation, it is only required to satisfy that a final network access state is that the first SIM card is in the connected state and the second SIM card is in the idle state or the inactive state.

At 102, the multi-card mobile terminal generates access request information of the second SIM card and transmits the access request information for a second network-side device, where the access request information includes a predefined capacity limitation indication.

In the operations at 102, the capacity limitation indication is used to indicate to the second network-side device that a current terminal wireless capacity of the multi-card mobile terminal is limited.

Specifically, as an implementation, for a 4-step RA procedure, the access request information may be third signaling, i.e., message (MSG 3), in the 4-step RA procedure. A field representing the capacity limitation indication is added into MSG 3, where the field can be predefined according to actual conditions.

In this case, the multi-card mobile terminal uses the field to indicate to the second network that an access terminal wireless capacity in this case is limited, needs to report details of the limitation after connection is established, and requires that the second network cannot exceed the limitation when configuring the terminal.

In the implementation, preferably, the capacity limitation indication is a field in signaling, where amount of information of the field may be one or more bits, which can be correspondingly set according to actual requirements.

As another implementation, for a 2-step RA procedure, the access request information may be first signaling, i.e., MSG A, in the 2-step RA procedure. A field representing the capacity limitation indication is added into MSG A, where the field can be predefined according to actual conditions.

In this case, the multi-card mobile terminal uses the field to indicate to the second network that an access terminal wireless capacity in this case is limited, needs to report details of the limitation after connection is established, and requires that the second network cannot exceed the limitation when configuring the terminal.

In the implementation, preferably, the capacity limitation indication is a field in signaling, where amount of information of the field may be one or more bits, which can be correspondingly set according to actual requirements.

As another implementation, the capacity limitation indication may also be a preset RA prefix or a preset RA occasion in RRC signaling, where on condition that the capacity limitation indication is the preset RA prefix (the prefix is the first signaling), the network configuration information is second signaling and fourth signaling in the 4-step RA procedure.

Specifically, a specific RA prefix (can be indicated by a specific RA preamble index) or a specific RA occasion (can be indicated by an RA synchronization signal block (SSB) occasion mask index) is regulated in the RRC signaling (system information or dedicated signaling) in advance.

At 103, the second network-side device receives the access request information of the second SIM card transmitted by the multi-card mobile terminal, where the access request information includes a predefined capacity limitation indication.

In the operations at 103, if it is detected that the current network access state of the first SIM card is the connected state and the second SIM card in the idle state or the inactive state initiates RA, the second network-side device receives the access request information with the capacity limitation indication, and determines and knows that the wireless capacity of the multi-card mobile terminal in this case is limited by using a field representing the capacity limitation indication. Furthermore, the second network-side device cannot perform configuration according to normal configuration for accessing the terminal or according to obtained terminal-wireless-capacity information, but needs to perform configuration according to the limited terminal wireless capacity reported in the field.

At 104, the second network-side device generates network configuration information corresponding to the access request information and transmits the network configuration information to the multi-card mobile terminal.

In the operations at 104, the second network-side device generates the network configuration information corresponding to the access request information according to the received access request information and transmits the network configuration information to the multi-card mobile terminal. The second network-side device transmits an RA response and wireless resource configuration information that correspond to the access request information, and needs to consider the limitation of the terminal wireless capacity when generating the response and performing configuration.

The limitation can be regulated according to an agreement or pre-agreed by the network and the terminal through a certain manner. The limitation may be number of connections, number of carriers, number of multiple input multiple output (MIMO) layers, a bandwidth class that are configured for the accessing terminal, and may also be frequency-domain configuration and time-domain frequency configuration that can be supported in a subsequent access procedure, e.g., the terminal can accept to be configured on an initial band width part (BWP) and cannot be changed to be configured on other BWPs.

Therefore, the network configuration information includes any one or more of: number of connections, number of carriers, number of MIMO layers, a bandwidth class, frequency-domain configuration information, or time-domain frequency configuration information that are configured for accessing the multi-card mobile terminal.

As an implementation, for a 4-step RA procedure, the network configuration information may be fourth signaling, i.e., MSG 4, in the 4-step RA procedure.

As another implementation, for a 2-step RA procedure, the network configuration information may be second signaling, i.e., MSG B, in the 2-step RA procedure.

At 105, the multi-card mobile terminal receives the network configuration information corresponding to the access request information transmitted by the second network-side device and configures software and hardware of a wireless transceiver of the multi-card mobile terminal.

In the operations at 105, the multi-card mobile terminal configures the software and hardware of the wireless transceiver of the multi-card mobile terminal according to the received network configuration information.

Before the multi-card mobile terminal reports a specific capacity limitation, the terminal can accept only configuration that is pre-agreed or regulated by a protocol, and the network can configure the terminal according to only the configuration that is pre-agreed or regulated by the protocol.

Figure 1:
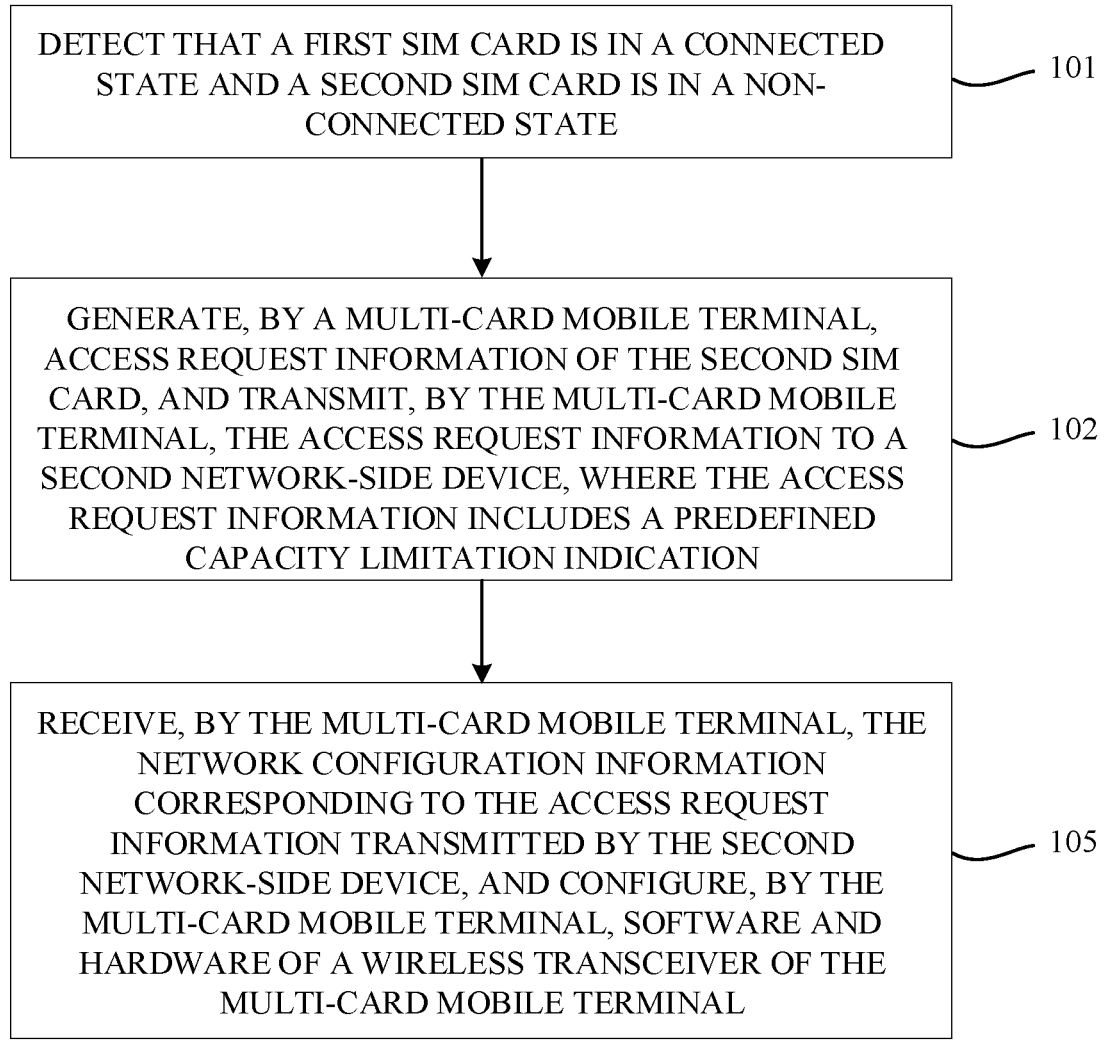
FIG. 1 is a schematic flow chart illustrating a network configuration method of a multi-card mobile terminal applied to a multi-card mobile terminal according to an implementation of the disclosure.

As another implementation, as illustrated in FIG. 1, a network configuration method of a multi-card mobile terminal is further provided in the implementation. The network configuration method is applied to a multi-card mobile terminal and mainly includes the above operations at 101, 102, and 105.

Figure 2:
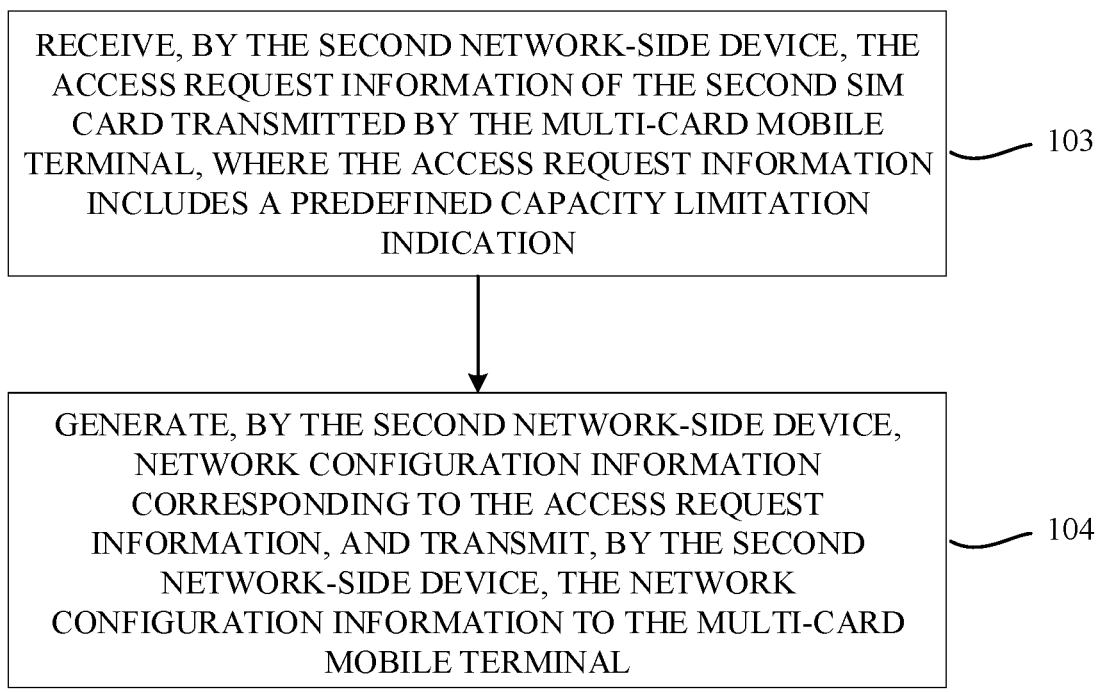
FIG. 2 is a schematic flow chart illustrating a network configuration method of a multi-card mobile terminal applied to a network-side device according to another implementation of the disclosure.

As another implementation, as illustrated in FIG. 2, a network configuration method of a multi-card mobile terminal is further provided in the implementation. The network configuration method is applied to a network-side device and mainly includes the above operations at 103 and 104.

Figure 7:
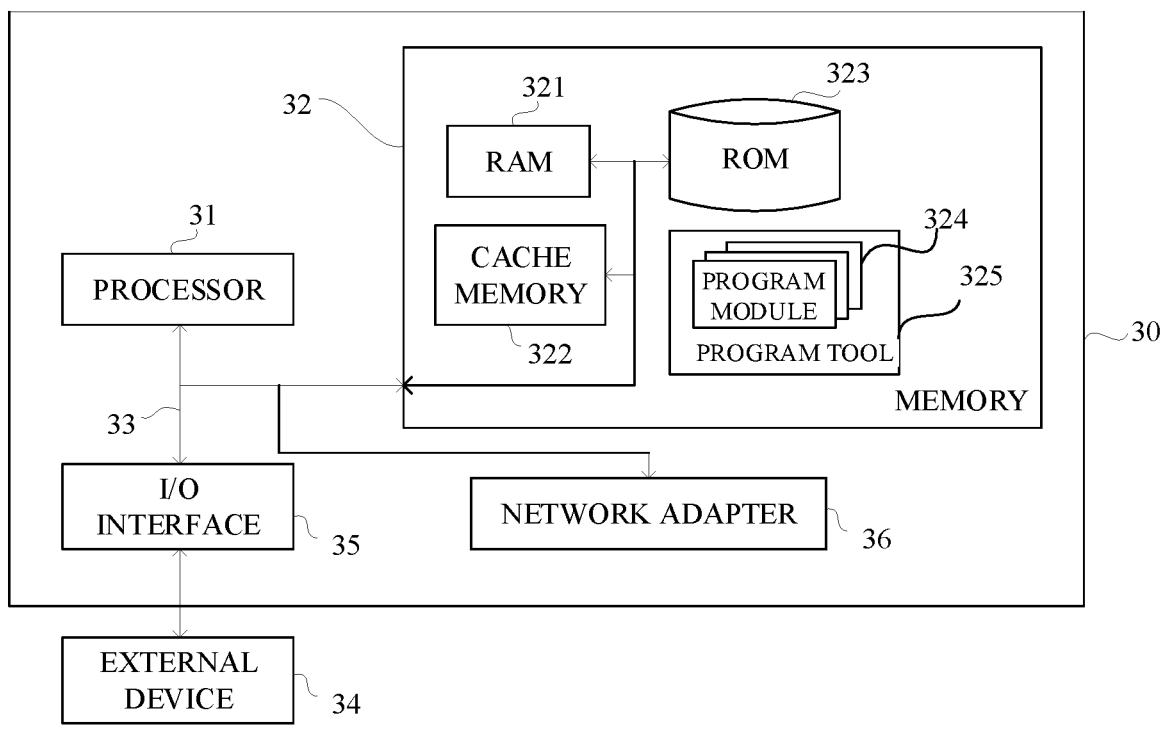
FIG. 7 is a schematic structural diagram illustrating an electronic device implementing a network configuration method of a multi-card mobile terminal according to another implementation of the disclosure.

FIG. 7 is a schematic structural diagram illustrating an electronic device according to another implementation of the disclosure. The electronic device includes a memory, a processor, and computer programs stored in the memory and capable of running on the processor. The processor is configured to execute the programs to implement the network configuration method of a multi-card mobile terminal in the above implementations. An electronic device 30 illustrated in FIG. 7 is only an example and may not constitute any limitation to functions and application scopes of implementations of the disclosure. The electronic device 30 may be implemented as a multi-card mobile terminal or a network-side device.

As illustrated in FIG. 7, the electronic device 30 may be represented as a general computing device, e.g., a server device. Components of the electronic device 30 may include, but are not limited to, at least one processor 31, at least one memory 32, and a bus 33 coupled with different system components (including the memory 32 and the processor 31).

The bus 33 includes a data bus, an address bus, and a control bus.

The memory 32 may include a volatile memory, e.g., a random access memory (RAM) 321 and/or a cache memory 322, and further include a read-only memory (ROM) 323.

The memory 32 may further include a program/practical tool 325 with a set of (at least one) program module 324, where the program module 324 includes, but is not limited to, an operating system, one or more application programs, other program modules, and program data, where each of or a certain combination of these examples may include implementation of a network environment.

The processor 31 is configured to execute the computer programs stored in the memory 32 to perform various functional applications and data processing, e.g., the network configuration method of a multi-card mobile terminal in the above implementations of the disclosure.

The electronic device 30 can also communicate with one or more external devices 34 (for example, a keyboard, a pointing device, and so on). The communication can be implemented through an input/output (I/O) interface 35. The electronic device 30 can also communicate with one or more networks (e.g., a local area network (LAN), a wide area network (WAN), and/or a public network, e.g., an internet) through a network adapter 36. As illustrated in FIG. 7, the network adapter 36 communicates with other modules of the electronic device 30 via the bus 33. It should understand that although not illustrated in the figure, other hardware and/or software modules can be used by combining with the electronic device 30, where the other hardware and/or software modules include, but are not limited to, a micro code, a device driver, a redundant processor, an external disk drive array, a redundant array of independent disk (RAID) system, a disk drive, and a data backup storage system.

It should be noted that although several units/modules or subunits/modules of the electronic device are mentioned in the above detailed illustration, this division is only exemplary and not mandatory. Actually, according to the implementations of the disclosure, the features and functions of two or more units/modules illustrated above can be implemented in one unit/module. On the contrary, the features and functions of one unit/module illustrated above can be further divided into multiple units/modules to be implemented.

A non-transitory computer-readable storage medium is provided in the implementation. The computer-readable storage medium is configured to store computer programs which when executed by a processor, are operable with the processor to implement the operations in the network configuration method of a multi-card mobile terminal in the above implementations.

The readable storage medium may specifically include, but is not limited to, a portable disk, a hard disk, an RAM, an ROM, an erasable programmable ROM (EPROM), an optical storage device, a magnetic storage device, or any suitable combination thereof.

In a possible implementation, the disclosure can also be implemented as a program product. The program product includes program codes which when executed on a terminal device, enable the terminal device to implement the operations in the network configuration method of a multi-card mobile terminal in the above implementations.

The program codes used to execute the disclosure can be programmed through any combinations of one or more types of program design languages. The program codes can be executed completely or partially on a user equipment (UE), executed as a separate software packet, executed partially on the UE and partially on a remote device, or executed completely on the remote device.

For overcoming current existing deficiencies, a network configuration system of a multi-card mobile terminal is further provided in the implementation. The network configuration system includes a multi-card mobile terminal and a network-side device. The multi-card mobile terminal is configured to generate access request information of another SIM card of the multi-card mobile terminal and transmit the access request information to an accessed target network-side device, in response to a current network access state of an SIM card of the multi-card mobile terminal being a connected state and the another SIM card requesting to access a target network, where the access request information includes a predefined capacity limitation indication, and the capacity limitation indication is used to indicate to a network-side device that a current terminal wireless capacity of the multi-card mobile terminal is limited. The network-side device is configured to receive the access request information of the another SIM card, generate network configuration information corresponding to the access request information, and transmit the network configuration information to the multi-card mobile terminal, where the network configuration information is used to indicate the multi-card mobile terminal to configure a network. The multi-card mobile terminal is further configured to receive the network configuration information, and configure the multi-card mobile terminal according to the network configuration information.

In the implementation, the network configuration system effectively avoids that the multi-card mobile terminal receives network configuration that is unable to be matched, thereby effectively avoiding failure of a network access request of the multi-card mobile terminal, and thus improving network configuration efficiency.

Figure 6:
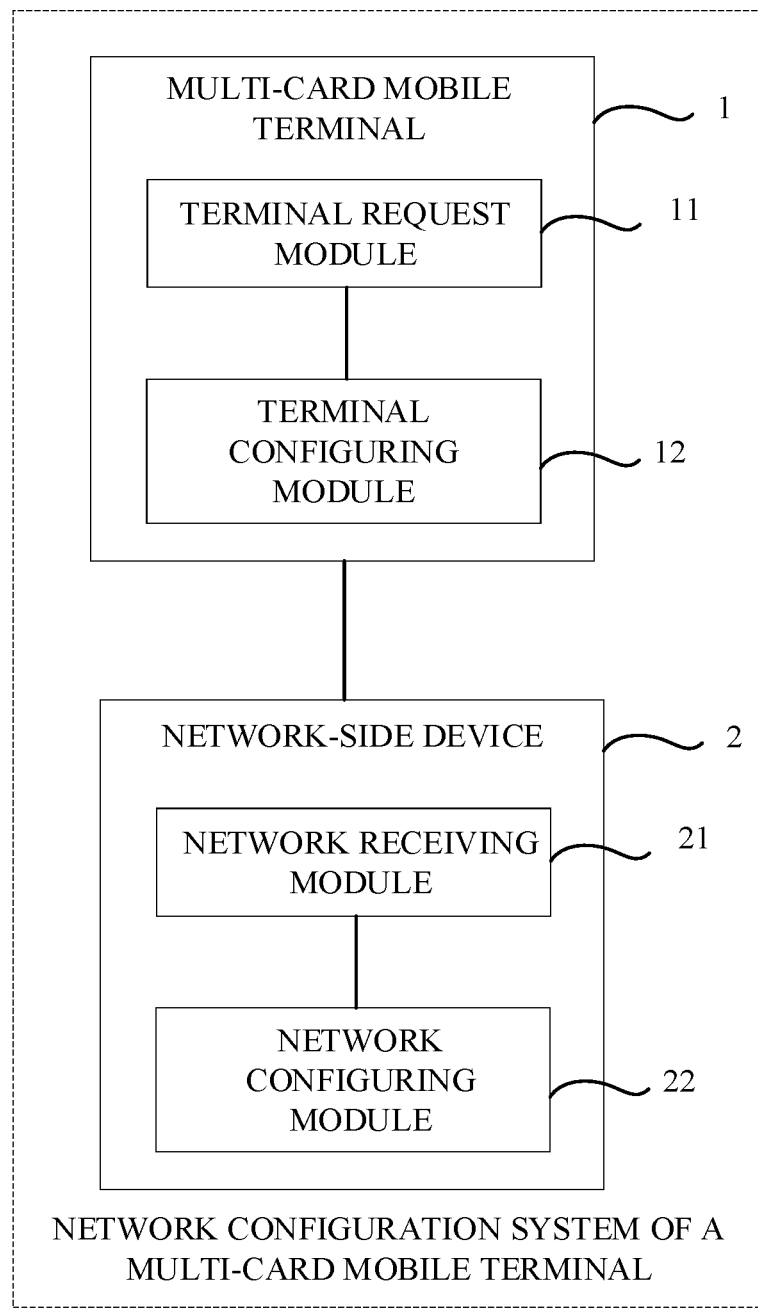
FIG. 6 is a schematic structural diagram illustrating a network configuration system of a multi-card mobile terminal according to an implementation of the disclosure.

Specifically, as an implementation, as illustrated in FIG. 6, the network configuration system mainly includes a multi-card mobile terminal 1 and a network-side device 2. The multi-card mobile terminal 1 mainly includes a terminal request module 11 and a terminal configuring module 12, and the network-side device 2 mainly includes a network receiving module 21 and a network configuring module 22.

In the implementation, preferably, a communication network standard of the multi-card mobile terminal 1 is a 5G standard, but a communication network type of the multi-card mobile terminal is not specifically limited and may also be a 2G standard, a 3G standard, a 4G standard, or other communication standards, which can be correspondingly selected and adjusted according to actual requirements.

In the implementation, preferably, the multi-card mobile terminal 1 is a dual-card mobile terminal. The dual-card mobile terminal mainly includes a first SIM card and a second SIM card, where the first SIM card corresponds to a first network, and the second SIM card corresponds to a second network. However, the multi-card mobile terminal may also be a mobile terminal supporting more SIM cards, which can be correspondingly selected and adjusted according to actual requirements.

In the implementation, the first network and the second network may be a same operator network and may also be different operator networks, which both can be correspondingly selected and adjusted according to actual requirements.

In the implementation, the network-side device 2 refers to a device at an accessed network side that corresponds to an SIM card of the multi-card mobile terminal. The network-side device may be a base station, a cloud server, etc., where a type of the network-side device is not specifically limited.

The terminal request module 11 is configured to generate access request information of the second SIM card and transmit the access request information to an accessed target network-side device 2, i.e., a second network-side device, in response to detecting that the first SIM card is in a connected state and the second SIM card is in a non-connected state, where the access request information includes a predefined capacity limitation indication, and the capacity limitation indication is used to indicate to the network-side device 2 that a current terminal wireless capacity of the multi-card mobile terminal 1 is limited.

Specifically, in the implementation, the terminal request module 11 is configured to generate the access request information of the second SIM card and transmit the access request information to the accessed network-side device 2 corresponding to the second SIM card, in response to detecting that a current network access state of the first SIM card is the connected state and the second SIM card in an idle state or an inactive state initiates RA.

The multi-card mobile terminal in the idle state can also use the second SIM card to establish connection with the second network at first, and then enter the inactive state. Afterwards, the multi-card mobile terminal uses the first SIM card to establish connection with the first network and enters the connected state.

There are also other procedures. For example, the multi-card mobile terminal uses the first SIM card to establish connection with the first network and then enters the inactive state. Then the multi-card mobile terminal uses the second SIM card to establish connection with the second network and enters the inactive state. Afterwards, the first SIM card enters the connected state again.

In the implementation, it is only required to satisfy that a final network access state is that the first SIM card is in the connected state and the second SIM card is in the idle state or the inactive state.

Specifically, as an implementation, for a 4-step RA procedure, the access request information may be third signaling, i.e., MSG 3, in the 4-step RA procedure. A field representing the capacity limitation indication is added into MSG 3, where the field can be predefined according to actual conditions.

In this case, the multi-card mobile terminal uses the field to indicate to the second network that an access terminal wireless capacity in this case is limited, needs to report details of the limitation after connection is established, and requires that the second network cannot exceed the limitation when configuring the terminal.

In the implementation, preferably, the capacity limitation indication is a field in signaling, where amount of information of the field may be one or more bits, which can be correspondingly set according to actual requirements.

As another implementation, for a 2-step RA procedure, the access request information may be first signaling, i.e., MSG A, in the 2-step RA procedure. A field representing the capacity limitation indication is added into MSG A, where the field can be predefined according to actual conditions.

In this case, the multi-card mobile terminal uses the field to indicate to the second network that an access terminal wireless capacity in this case is limited, needs to report details of the limitation after connection is established, and requires that the second network cannot exceed the limitation when configuring the terminal.

In the implementation, preferably, the capacity limitation indication is a field in signaling, where amount of information of the field may be one or more bits, which can be correspondingly set according to actual requirements.

As another implementation, the capacity limitation indication may also be a preset RA prefix or a preset RA occasion in RRC signaling, where on condition that the capacity limitation indication is the preset RA prefix (the prefix is the first signaling), the network configuration information is second signaling and fourth signaling in the 4-step RA procedure.

Specifically, a specific RA prefix (can be indicated by a specific RA preamble index) or a specific RA occasion (can be indicated by an RA SSB occasion mask index) is regulated in the RRC signaling (system information or dedicated signaling) in advance.

The network receiving module 21 of the second network-side device is configured to receive the access request information of the second SIM card transmitted by the multi-card mobile terminal, where the access request information includes a predefined capacity limitation indication.

In the implementation, the network receiving module 21 is configured to receive the access request information with the capacity limitation indication, and determine and know that the wireless capacity of the multi-card mobile terminal in this case is limited by using a field representing the capacity limitation indication. Furthermore, the network receiving module 21 cannot perform configuration according to normal configuration for accessing the terminal or according to obtained terminal-wireless-capacity information, but needs to perform configuration according to the limited terminal wireless capacity reported in the field.

The network configuring module 22 is configured to generate network configuration information corresponding to the access request information and transmits the network configuration information to the multi-card mobile terminal.

In the implementation, the network configuring module 22 is configured to generate the network configuration information corresponding to the access request information according to the received access request information and transmit the network configuration information to the multi-card mobile terminal. The network configuring module 22 transmits an RA response and wireless resource configuration information that correspond to the access request information, and the network configuring module 22 needs to consider the limitation of the terminal wireless capacity when generating the response and performing configuration.

The limitation can be regulated according to an agreement or pre-agreed by the network and the terminal through a certain manner. The limitation may be number of connections, number of carriers, number of MIMO layers, a bandwidth class that are configured for the accessing terminal, and may also be frequency-domain configuration and time-domain frequency configuration that can be supported in a subsequent access procedure, e.g., the terminal can accept to be configured on an initial BWP and cannot be changed to be configured on other BWPs.

Therefore, the network configuration information includes any one or more of: number of connections, number of carriers, number of MIMO layers, a bandwidth class, frequency-domain configuration information, or time-domain frequency configuration information that are configured for accessing the multi-card mobile terminal.

As an implementation, for a 4-step RA procedure, the network configuration information may be fourth signaling, i.e., MSG 4, in the 4-step RA procedure.

As another implementation, for a 2-step RA procedure, the network configuration information may be second signaling, i.e., MSG B, in the 2-step RA procedure.

The terminal configuring module 12 is configured to receive the network configuration information corresponding to the access request information transmitted by the second network-side device and configure software and hardware of a wireless transceiver of the multi-card mobile terminal.

Before the multi-card mobile terminal reports a specific capacity limitation, the terminal can accept only configuration that is pre-agreed or regulated by a protocol, and the network can configure the terminal according to only the configuration that is pre-agreed or regulated by the protocol.

Figure 4:
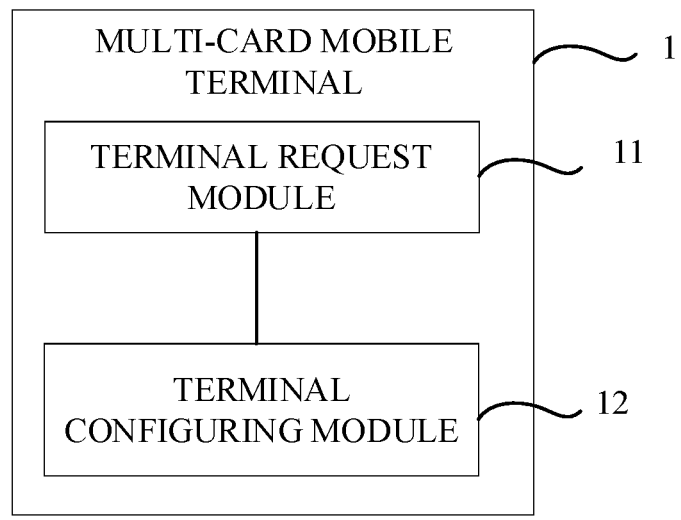
FIG. 4 is a schematic structural diagram illustrating a multi-card mobile terminal according to an implementation of the disclosure.

As an implementation, as illustrated in FIG. 4, a multi-card mobile terminal 1 is provided in the implementation. The multi-card mobile terminal 1 mainly includes the above terminal request module 11 and the above terminal configuring module 12.

Figure 5:
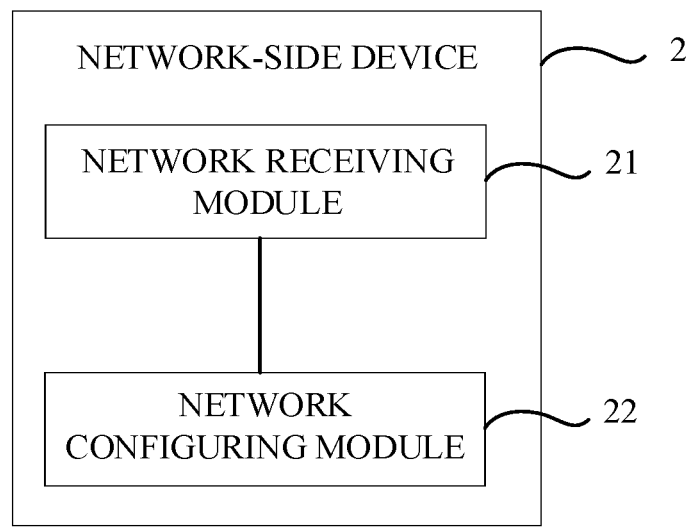
FIG. 5 is a schematic structural diagram illustrating a network-side device according to an implementation of the disclosure.

As an implementation, as illustrated in FIG. 5, a network-side device 2 is provided in the implementation. The network-side device 2 mainly includes the above network receiving module 21 and the above network configuring module 22.

According to the network configuration method of a multi-card mobile terminal and the network configuration system of a multi-card mobile terminal provided in the implementation, the multi-card mobile terminal receives network configuration that is unable to be matched is effectively avoided, thereby effectively avoiding failure of a network access request of the multi-card mobile terminal, and thus improving network configuration efficiency.

Although the specific implementations of the disclosure have been described above, those skilled in the art should understand that those are only as examples for illustration, and the scope of protection of the disclosure is limited by the appended claims. For those skilled in the art, many changes or modifications can be made to these implementations without departing from the principle and essence of the disclosure, but these changes and modifications all fall within the scope of protection of the disclosure.

What is claimed is:

1. A network configuration method of a multi-card mobile terminal applied to the multi-card mobile terminal, comprising:
in response to a first network access state of a subscriber identity module (SIM) card of the multi-card mobile terminal being a connected state and another SIM card of the multi-card mobile terminal requesting to access a target network, generating access request information of the another SIM card and transmitting the access request information to a target network-side device, the access request information comprising a capacity limitation indication, the capacity limitation indication being configured to indicate that a current terminal wireless capacity of the multi-card mobile terminal is limited; wherein the capacity limitation indication is a preset RA prefix or a preset RA occasion in radio resource control (RRC) signaling, wherein on condition that the capacity limitation indication is the preset RA prefix, the network configuration information is second signaling and fourth signaling in a 4-step RA procedure; and
receiving network configuration information corresponding to the access request information transmitted by the target network-side device; and
configuring the multi-card mobile terminal according to the network configuration information.

2. The network configuration method of claim 1, wherein a second network access state of the another SIM card requesting to access the target network is an idle state or an inactive state.

3. The network configuration method of claim 1, wherein
the access request information is third signaling in a 4-step random access (RA) procedure; and
the capacity limitation indication is a field in signaling, wherein amount of information of the field comprises one or more bits.

4. The network configuration method of claim 1, wherein
the access request information is first signaling in a 2-step RA procedure; and
the capacity limitation indication is a field in signaling, wherein amount of information of the field comprises one or more bits.

5. A multi-card mobile terminal, comprising:
a memory;
a processor; and
computer programs stored in the memory and capable of running on the processor;
the processor being configured to execute the computer programs to implement:
in response to a first network access state of a subscriber identity module (SIM) card of the multi-card mobile terminal being a connected state and another SIM card of the multi-card mobile terminal requesting to access a target network, generating access request information of the another SIM card and transmitting the access request information to a target network-side device, the access request information comprising a capacity limitation indication, the capacity limitation indication being configured to indicate that a current terminal wireless capacity of the multi-card mobile terminal is limited; wherein the capacity limitation indication is a preset RA prefix or a preset RA occasion in radio resource control (RRC) signaling, wherein on condition that the capacity limitation indication is the preset RA prefix, the network configuration information is second signaling and fourth signaling in a 4-step RA procedure; and
receiving network configuration information corresponding to the access request information transmitted by the target network-side device; and
configuring the multi-card mobile terminal according to the network configuration information.

6. A non-transitory computer-readable storage medium configured to store computer programs, wherein the computer programs, when executed by a processor, are operable with the processor to implement:
in response to a first network access state of a subscriber identity module (SIM) card of the multi-card mobile terminal being a connected state and another SIM card of the multi-card mobile terminal requesting to access a target network, generating access request information of the another SIM card and transmitting the access request information to a target network-side device, the access request information comprising a capacity limitation indication, the capacity limitation indication being configured to indicate that a current terminal wireless capacity of the multi-card mobile terminal is limited; wherein the capacity limitation indication is a preset RA prefix or a preset RA occasion in radio resource control (RRC) signaling, wherein on condition that the capacity limitation indication is the preset RA prefix, the network configuration information is second signaling and fourth signaling in a 4-step RA procedure; and receiving network configuration information corresponding to the access request information transmitted by the target network-side device; and configuring the multi-card mobile terminal according to the network configuration information.

7. The network configuration method of claim 3, wherein the network configuration information is fourth signaling in the 4-step RA procedure.

8. The network configuration method of claim 4, wherein the network configuration information is second signaling in the 2-step RA procedure.

9. The network configuration method of claim 1, wherein the network configuration information comprises any one or more of: number of connections, number of carriers, number of multiple input multiple output (MIMO) layers, a bandwidth class, band width part (BWP) information, frequency-domain configuration information, or time-domain frequency configuration information that are configured for accessing the multi-card mobile terminal.

10. The network configuration method of claim 1, wherein a communication network standard of the multi-card mobile terminal comprises a 5th-generation mobile communication technology (5G) standard.

11. The multi-card mobile terminal of claim 5, wherein a second network access state of the another SIM card requesting to access the target network is an idle state or an inactive state.

12. The multi-card mobile terminal of claim 5, wherein
the access request information is third signaling in a 4-step random access (RA) procedure; and
the capacity limitation indication is a field in signaling, wherein amount of information of the field comprises one or more bits.

13. The multi-card mobile terminal of claim 5, wherein
the access request information is first signaling in a 2-step RA procedure; and
the capacity limitation indication is a field in signaling, wherein amount of information of the field comprises one or more bits.

14. The multi-card mobile terminal of claim 12, wherein the network configuration information is fourth signaling in the 4-step RA procedure.

15. The multi-card mobile terminal of claim 13, wherein the network configuration information is second signaling in the 2-step RA procedure.

16. The multi-card mobile terminal of claim 5, wherein the network configuration information comprises any one or more of: number of connections, number of carriers, number of multiple input multiple output (MIMO) layers, a bandwidth class, band width part (BWP) information, frequency-domain configuration information, or time-domain frequency configuration information that are configured for accessing the multi-card mobile terminal.

17. The multi-card mobile terminal of claim 5, wherein a communication network standard of the multi-card mobile terminal comprises a 5th-generation mobile communication technology (5G) standard.

18. The non-transitory computer-readable storage medium of claim 6, a second network access state of the another SIM card requesting to access the target network is an idle state or an inactive state.

* * * * *